United States Patent
Bilek et al.

(10) Patent No.: US 12,397,638 B2
(45) Date of Patent: Aug. 26, 2025

(54) AUTOMATED EYE ADAPTATION SYSTEM AND METHOD

(71) Applicant: HONEYWELL INTERNATIONAL INC., Charlotte, NC (US)

(72) Inventors: Jan Bilek, Brno (CZ); John G. Suddreth, Phoenix, AZ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 190 days.

(21) Appl. No.: 18/354,232

(22) Filed: Jul. 18, 2023

(65) Prior Publication Data
US 2025/0026200 A1    Jan. 23, 2025

(51) Int. Cl.
| | |
|---|---|
| B60K 35/00 | (2024.01) |
| G01C 21/34 | (2006.01) |
| H05B 47/11 | (2020.01) |
| B60K 35/28 | (2024.01) |

(52) U.S. Cl.
CPC .......... B60K 35/00 (2013.01); G01C 21/3453 (2013.01); H05B 47/11 (2020.01); B60K 35/28 (2024.01); *B60K 2360/166* (2024.01); *B60K 2360/349* (2024.01)

(58) Field of Classification Search
None
See application file for complete search history.

(56) References Cited

U.S. PATENT DOCUMENTS

| | | | |
|---|---|---|---|
| 9,493,112 B2 | 11/2016 | Thomas et al. | |
| 11,173,833 B2 | 11/2021 | Seol | |
| 11,305,690 B2 | 4/2022 | Pflug et al. | |
| 11,491,912 B2 | 11/2022 | Park | |
| 11,524,691 B2 | 12/2022 | Gallagher et al. | |
| 2019/0033860 A1 | 1/2019 | Okimoto et al. | |
| 2019/0232866 A1 | 8/2019 | Holland et al. | |
| 2020/0172009 A1 | 6/2020 | Seol | |
| 2020/0398747 A1 | 12/2020 | Tani | |
| 2021/0158765 A1* | 5/2021 | Nishimura | B60Q 3/74 |
| 2022/0258665 A1* | 8/2022 | Lindberg Nilsson | B60Q 3/80 |
| 2023/0219495 A1 | 7/2023 | Takamatsu et al. | |

FOREIGN PATENT DOCUMENTS

| | | |
|---|---|---|
| CN | 111642046 B | 7/2021 |
| CN | 115666987 A | 1/2023 |
| JP | 2020157857 A | 10/2020 |
| JP | 2021126985 A | 9/2021 |

\* cited by examiner

*Primary Examiner* — Kenneth B Wells
(74) *Attorney, Agent, or Firm* — Ingrassia Fisher & Lorenz, LLP

(57) ABSTRACT

A system and method for adjusting brightness level within a vehicle includes supplying, to a processing system, destination brightness data, exterior brightness data, and interior brightness data. At least the destination data, the exterior brightness data, and the interior brightness data are processed in the processing system to: compute an estimated time of arrival (ETA) for the vehicle to arrive at a predetermined mission destination location, compare the computed ETA to a maximum sight adaptation time, and based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle.

16 Claims, 2 Drawing Sheets

AUTOMATED EYE ADAPTATION SYSTEM AND METHOD

TECHNICAL FIELD

The present disclosure relates to sight adaptation systems and methods and, more particularly, to a system and method for automating sight adaption for persons within a vehicle.

BACKGROUND

In certain contents, the occupants of a vehicle, including the driver and/or passengers, may be expected, upon reaching an assigned destination, to immediately exit the vehicle and engage in the environment outside of the vehicle. The ability to immediately engage can be impacted by the brightness difference between the vehicle interior and outside environment. In particular, the brightness difference may adversely impact the sight adaptation time of the occupants exiting the vehicle, which can lead to decreased performance for the duration of sight adaptation time. This issue may occur both in the case of moving from a relatively dark environment to relatively bright environment, where receptor overload can cause temporary white-out, and in the case of moving from a relatively bright environment to a relatively dark environment, where it may take several minutes for a person's eyes to sufficiently adapt.

Hence, there is a need for an automated sight adaptation system and method that automatically adjusts the brightness level within a vehicle to at least mitigate the potential performance decrease associated with the sight adaptation time. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a sight adaptation system for a vehicle includes a mission data source, an exterior luminance sensor, an interior brightness level data source, and a processing system. The mission data source is configured to supply destination brightness data that is indicative of a brightness level at a predetermined mission destination location. The exterior luminance sensor is configured to sense current exterior brightness level outside of the vehicle and to supply exterior brightness data indicative of the current exterior brightness level. The interior brightness level data source is configured to supply interior brightness data indicative of current interior brightness level within the vehicle. The processing system is coupled to receive at least the destination brightness data, the exterior brightness data, and the interior brightness data. The processing system is configured to process at least the destination data, the exterior brightness data, and the interior brightness data to: compute an estimated time of arrival (ETA) for the vehicle to arrive at the predetermined mission destination location, compare the computed ETA to a maximum sight adaptation time, and based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle.

In another embodiment, a method for adjusting brightness level within a vehicle includes supplying, to a processing system, destination brightness data, exterior brightness data, and interior brightness data. At least the destination data, the exterior brightness data, and the interior brightness data are processed in the processing system to: compute an estimated time of arrival (ETA) for the vehicle to arrive at a predetermined mission destination location, compare the computed ETA to a maximum sight adaptation time, and based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle. The destination brightness data is indicative of a brightness level at the predetermined mission destination location. The exterior brightness data is indicative of current exterior brightness level. The interior brightness data is indicative of current interior brightness level within the vehicle.

In yet another embodiment, a sight adaptation system for a vehicle includes a mission data source, an interior brightness level data source, and a processing system. The mission data source is configured to supply destination brightness data that is indicative of a brightness level at a predetermined mission destination location. The interior brightness level data source is configured to supply interior brightness data indicative of current interior brightness level within the vehicle. The processing system is coupled to receive at least the destination brightness data and the interior brightness data. The processing system is configured to process at least the destination data and the interior brightness data to: compute an estimated time of arrival (ETA) for the vehicle to arrive at the predetermined mission destination location, compare the computed ETA to a maximum sight adaptation time, and based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle. The first brightness level adjustment process includes a first sight adaptation time, which corresponds to a first time to adjust the brightness level within the vehicle to at least substantially match the exterior brightness level when the person exits vehicle at the predetermined mission destination location. The second brightness level adjustment process includes a second sight adaptation time, which corresponds to a second time to adjust the brightness level within the vehicle to at least approach the exterior brightness level when the person exits vehicle at the predetermined mission destination location. The first sight adaptation time is greater than the second sight adaptation time.

Furthermore, other desirable features and characteristics of the automated sight adaptation systems and methods will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
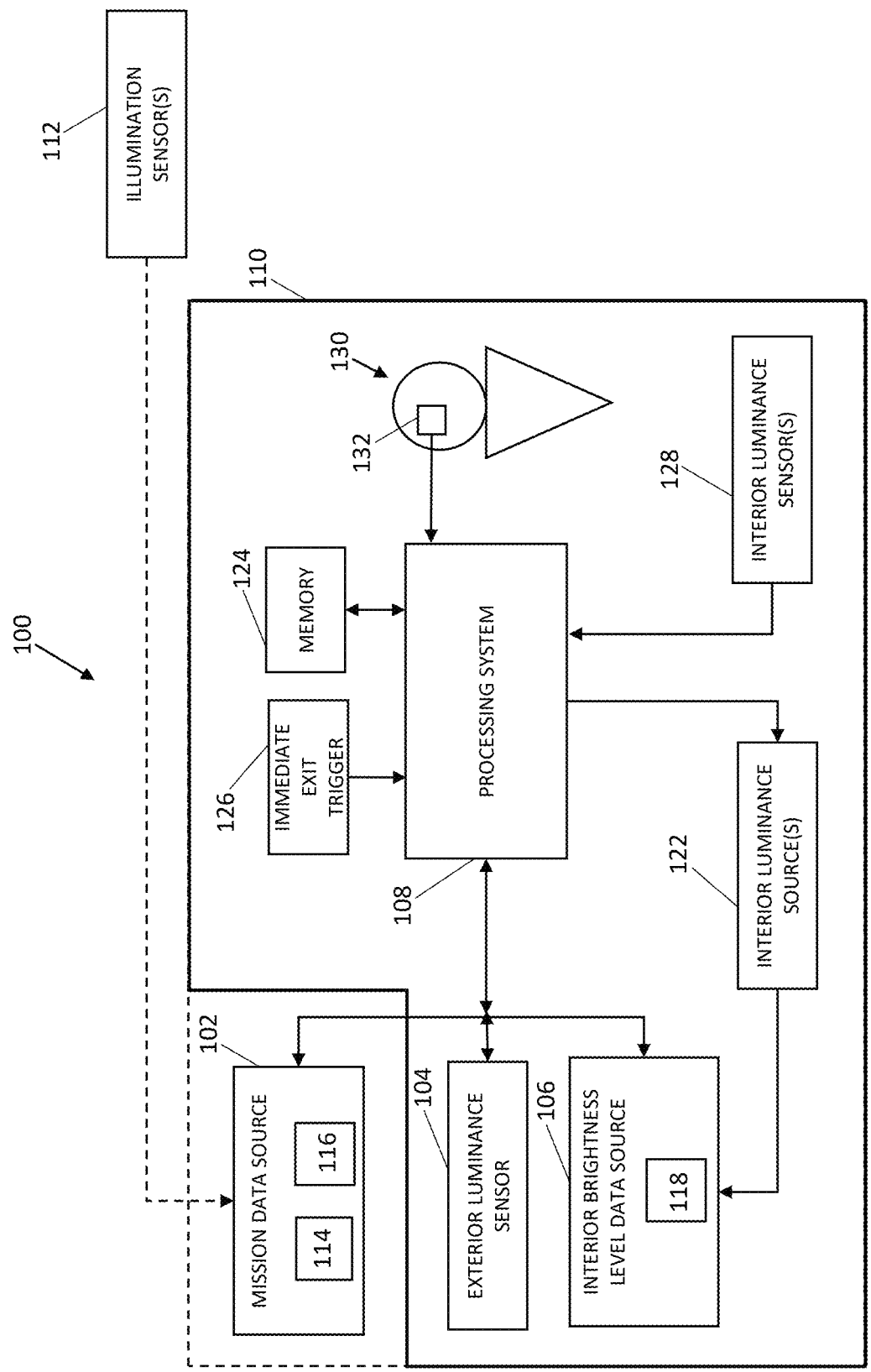
FIG. 1 depicts a functional block diagram of one embodiment of an automated sight adaptation system.

Referring to FIG. 1, a functional block diagram of one embodiment of an automated sight adaptation system 100 is depicted and includes a mission data source 102, an exterior luminance sensor 104, an interior brightness level data source 106, and a processing system 108. As FIG. 1 also depicts, at least a portion of the system 100 is disposed within a vehicle 110, which may be any one of numerous types of terrestrial vehicles, waterborne vehicles, or airborne vehicles. For example, as depicted using dotted lines in FIG. 1, some or all of the mission data source 102 may be disposed remote from the vehicle 110. It is noted that regardless of the particular type of vehicle 110, the vehicle 110 will have, when deployed, a location to which it is destined to travel for a mission. This location is referred to herein as a predetermined mission destination location.

The mission data source 102 is configured to supply destination brightness data that is indicative of the brightness level at the predetermined mission destination location. It will be appreciated that the mission data source 102 may be variously configured and implemented. For example, in some embodiments, the mission data source 102 may include one or more remote illumination sensors 112 disposed at the predetermined mission destination location. The remote illumination sensors 112, which may be implemented using any one of numerous types of illumination sensors, are configured to sense the brightness level at the predetermined mission destination location to thereby generate the destination brightness data. The remote illumination sensors 112 are additionally configured to transmit the destination brightness data, in real-time, to the processing system 108.

In other embodiments, the mission data source 102 may be implemented using one or more processors 114 that are configured to generate the destination brightness data from other types of input data. For example, the mission data source 102 may be configured, via the one or more processors 114, to receive and process data indicative of the estimated time of arrival for the vehicle 110 to arrive at the predetermined mission destination location to generate the destination brightness data. In these embodiments, the mission data source 102 may be further configured to receive various other additional data for the predetermined mission destination location and to generate the destination brightness data based additionally on the additional data. Some examples of the additional data include, without limitation, time, date, solar and lunar cycles, forecast weather, air particulate levels (dust or smog), and whether the destination location is indoors or outdoors. The time, date, solar and lunar cycles may provide a baseline for the estimated brightness level at the destination location, and the additional data may be used, for example, to more accurately estimate the brightness level at the destination location. The additional data may, in some embodiments, further include primary direction data (i.e., whether the person is moving into or out of the sun), local terrain data, and/or foliage concentration data. For example, the destination location could be in a valley or heavily wooded area, shielded from the sun, resulting in a darker than expected brightness level.

In still other embodiments, the mission data source 102 may simply be, for example, a user interface 116 that is in operable communication with the processing system 108. In these embodiments, the destination brightness data may be input manually, via the user interface 116.

The exterior luminance sensor 104 is configured to sense the current exterior brightness level outside of the vehicle 110 and to supply exterior brightness data indicative of the current exterior brightness level. Preferably, the exterior luminance sensor 104 is mounted on the vehicle 110 and is disposed to readily sense the current exterior brightness level outside of the vehicle 110. It will be appreciated that the exterior luminance sensor 104 may be implemented using any one of numerous known luminance sensors. It will additionally be appreciated that in some embodiments the system 100 may be implemented without the exterior luminance sensor 104.

The interior brightness level data source 106 is configured to supply interior brightness data indicative of current interior brightness level within the vehicle 110. It will be appreciated that the interior brightness level data source 106 may also be variously configured and implemented. For example, in some embodiments, the interior brightness level data source 106 is implemented using an interior luminance sensor that is configured to sense the current interior brightness level within the vehicle 110.

In other embodiments, the interior brightness level data source 106 may be implemented using one or more processors 118 that are configured to generate the interior brightness data from other types of input data. For example, the interior brightness level data source 106 may be configured, via the one or more processors 118, to receive and process data indicative of the intensity of the interior lights 122 within the vehicle 110 to thereby generate the interior brightness level data.

No matter how the mission data source 102, the exterior luminance sensor 104, and the interior brightness level data source 106 are configured, each is in operable communication with the processing system 108. The processing system 108 may include one or more processors and computer-readable storage devices or media encoded with programming instructions for configuring the processing system 108. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the one or more processors.

The processing system 108 is coupled to receive at least the destination brightness data, the exterior brightness data, and the interior brightness data. The processing system 108 is configured to process at least the minimal set of destination data, the exterior brightness data (when provided), and the interior brightness data to selectively implement either a first brightness level adjustment process or a second brightness level adjustment process. More specifically, the processing system 108 is configured to compute the estimated time of arrival (ETA) for the vehicle 110 to arrive at the predetermined mission destination location and compare the computed ETA to a maximum sight adaptation time.

Before proceeding further, it is noted that the maximum sight adaptation time is an amount of time that it takes, on average, for a person's eyes to adjust when transitioning from one brightness level to another brightness level, whether it be from a high brightness level to a low brightness level or from a low brightness level to a high brightness level. For example, the maximum sight adaptation time when transitioning from a low brightness level (e.g., relatively dark) to a high brightness level (e.g., daylight) is about 5 minutes, whereas the maximum sight adaptation time when transitioning from a high brightness level to a low brightness level is at least about 10 minutes (and even up to 45 minutes). Moreover, the maximum sight adaptation time may vary depending on the relative brightness levels to which the person is transitioning. Thus, the maximum sight adaptation time that is used in the processing system 108 may, at least in some embodiments, vary depending on the relative brightness levels. The maximum sight adaptation time(s) may be stored, for example, in a memory 124 that is implemented separate from, or as part of, the processing system 108

With the above in mind, the processing system 108 is further configured, based on the comparison of the computed ETA and the maximum sight adaptation time, to implement either the first brightness level adjustment process for adjusting the interior brightness level within the vehicle 110 or a second brightness level adjustment process for adjusting the interior brightness level within the vehicle 110. To this end, and as FIG. 1 further depicts, the processing system 108 is in operable communication with, and is configured to control, the one or more interior luminance sources 122 to thereby adjust the interior brightness level within the vehicle 110 according to the first or second brightness level adjustment process.

It will be appreciated that the one or more interior luminance sources 122 may be implemented using various types of devices. For example, the interior luminance source(s) 122 may be implemented using known vehicle interior lights, such as LEDs, incandescent, or halogen lights just to name a few. The interior luminance source(s) may also (or instead) be implemented using vehicle control panels and/or display devices. As is generally known, because displays have minimum and maximum usable brightness levels, the processing system may also be configured, at least in some embodiment, to adjust pixel saturation levels to help control overall ambient luminance levels.

The first brightness level adjustment process is implemented using a first sight adaptation time, and the second brightness level adjustment process is implemented using a second sight adaptation time that is less than the first sight adaptation time. The first sight adaptation time corresponds to a first time to gradually adjust the brightness level within the vehicle 110 to at least substantially match the exterior brightness level when the person exits vehicle 110 at the predetermined mission destination location, and the second sight adaptation time corresponds to a second time to adjust the brightness level within the vehicle to at least approach the exterior brightness level when the person exits vehicle at the predetermined mission destination location. It is noted that the phrase "at least approach the exterior brightness level" as used herein means that the brightness level may not, in some instances, be adjusted to substantially match (i.e., be within 5% of) the exterior brightness level.

More specifically, the processing system 108, at least in one embodiment, is configured to implement the first brightness level adjustment process when the computed ETA at least substantially equals the maximum sight adaptation time, and to implement the second brightness level adjustment process when the computed ETA is less than the maximum sight adaptation time. This is because the first brightness level adjustment process will cause the brightness level within the vehicle 110 to be adjusted over a time period that at least substantially matches the maximum sight adaptation time, whereas the second brightness level adjustment process will cause the brightness level within the vehicle 110 to be adjusted over a time period that is less than the maximum sight adaptation time. It should be further noted that when the computed ETA exceeds the maximum sight adaptation time, the processing system 108 will not implement either the first brightness level adjustment process or second brightness level adjustment process. It is noted that the phrase "at least substantially match the maximum sight adaptation time" is used herein because this allows for a buffer to account for potential variations in the time of arrival.

It will be appreciated that the second brightness level adjustment process, because it is faster that than the first brightness level adjustment process, may not result in a person attaining full sight adaptation, but may attain the best possible result within the available time. The second brightness level adjustment process is implemented because, as noted above, the computed ETA is less than the maximum sight adaptation time. However, in some embodiments, the second brightness level adjustment process may also be implemented if an unexpected situation arises that requires immediate exit from the vehicle 110. In such embodiments, the processing system 100 is further configured to receive an immediate exit trigger signal and, upon receipt thereof, to implement the second brightness level adjustment process.

It will be appreciated that the source of the immediate exit trigger signal may vary. For example, the source 126 may be a switch disposed in a passenger compartment of the vehicle, a switch disposed in a driver compartment of a vehicle, or a switch mechanism connected to a door of the vehicle, just to name a few.

In some embodiments, the system 100 may additionally include one or more sensors for provide feedback to the processing system 108. These sensors may include one or more interior luminance sensors 128, which may be implemented using any one of numerous known luminance sensors, a camera, or array of sensors and/or cameras. In some embodiments, the system 100 may additionally (or instead) include one or more ocular sensors 132 (for clarity, only one shown). The ocular sensor(s) 132, when included is configured to sense at least the pupil size and eye activity of a person 130 (or persons) within the vehicle 110 and to supply ocular data indicative thereof to the processing system 108. The processing system 108 in such embodiments is further configured to process the ocular data to adjust, in real-time, the first sight adaptation process or the second sight adaptation process, as the case may be.

Figure 2:
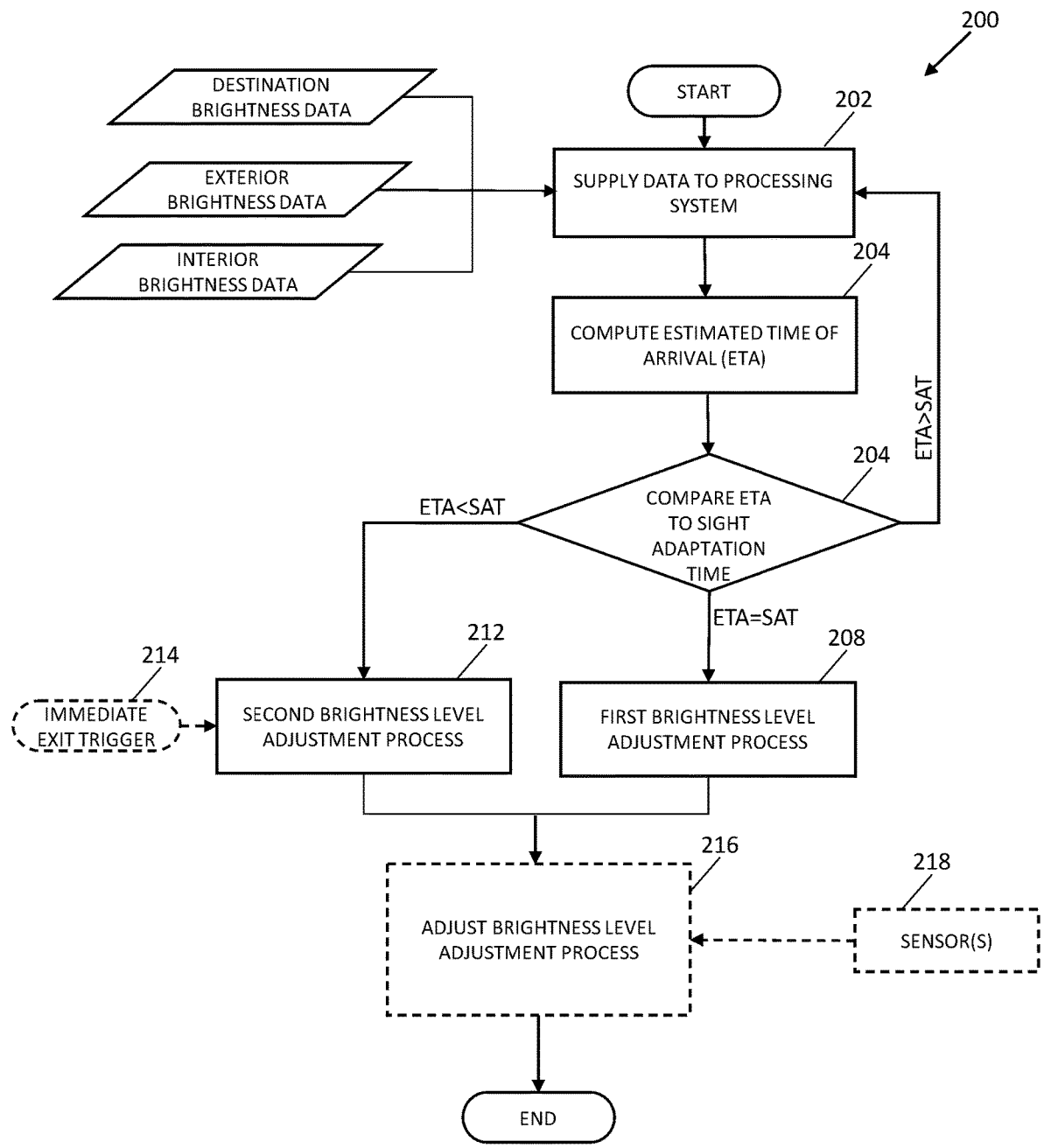
FIG. 2 depicts a process flowchart of one example process, implemented in the system of FIG. 1, for adjusting brightness level within a vehicle.

Referring now to FIG. 2, a process flowchart is depicted of one example process 200, implemented in the system 100, for adjusting brightness level within a vehicle 110. The order of operations within the process 200 is not limited to the sequential execution as illustrated in the figure, but may be performed in one or more varying orders as applicable and in accordance with the present disclosure.

The example process 200, which may be implemented within the processing system 108, includes supplying the destination brightness data, the exterior brightness data, and the interior brightness data to the processing system 108 (202) and processing these data in the processing system 108 to compute an estimated time of arrival (ETA) for the vehicle 110 to arrive at a predetermined mission destination location (204). The computed ETA is compared to a maximum sight adaptation time (206) and based on the comparison, either the first brightness level adjustment process, the second brightness level adjustment process, or neither adjustment level process is implemented.

That is, when the computed ETA exceeds the maximum sight adaptation time, neither the first brightness level adjustment process nor the second brightness level adjustment process is implemented, and the process 200 repeats. When the computed ETA at least substantially equals the maximum sight adaptation time, the first brightness level adjustment process is implemented (208), and when the computed ETA is less than the maximum sight adaptation time, the second brightness level adjustment process is implemented (212).

As FIG. 2 also depicts, the process 200 may, in some embodiments, implement the second brightness level adjustment process (212) upon receipt of the immediate exit trigger signal (214). In addition, the process 200 may, in some embodiments, adjust the first or second sight adaptation process (216) based on the data received from the one or more feedback sensor(s) (218).

The system and method described herein automatically adjusts the brightness level within a vehicle to at least mitigate the potential performance decrease associated with the sight adaptation time.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

As used herein, the term "substantially" denotes within 5% to account for uncertainties. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A sight adaptation system for a vehicle, comprising:
   a mission data source configured to (i) generate destination brightness data at least from data indicative of an estimated time of arrival for the vehicle to arrive at a predetermined mission destination location and (ii) supply the destination brightness data, the destination brightness data being data that is indicative of the brightness level at the predetermined mission destination location;
   an exterior luminance sensor configured to sense current exterior brightness level outside of the vehicle and to supply exterior brightness data indicative of the current exterior brightness level;
   an interior brightness level data source configured to supply interior brightness data indicative of current interior brightness level within the vehicle; and
   a processing system coupled to receive at least the destination brightness data, the exterior brightness data, and the interior brightness data, the processing system configured to process at least the destination data, the exterior brightness data, and the interior brightness data to:
      compute an estimated time of arrival (ETA) for the vehicle to arrive at the predetermined mission destination location;
      compare the computed ETA to a maximum sight adaptation time; and
      based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle.

2. The system of claim 1, wherein:
   the first brightness level adjustment process includes a first sight adaptation time, which corresponds to a first time to adjust the brightness level within the vehicle to at least substantially match the exterior brightness level when the person exits vehicle at the predetermined mission destination location;
   the second brightness level adjustment process includes a second sight adaptation time, which corresponds to a second time to adjust the brightness level within the vehicle to at least approach the exterior brightness level when the person exits vehicle at the predetermined mission destination location; and the first sight adaptation time is greater than the second sight adaptation time.

3. The system of claim 1, further comprising:

an ocular sensor configured to sense at least pupil size and eye activity of the person within the vehicle and supply ocular data indicative thereof to the processing system, wherein the processing system is further configured to process the ocular data to adjust, in real-time, the first sight adaptation process or the second sight adaptation process.

4. The system of claim 1, wherein the processor is further configured to:

not implement either the first brightness level adjustment process or second brightness level adjustment process when the computed ETA exceeds the maximum sight adaptation time;

implement the first brightness level adjustment process when the computed ETA at least substantially equals the maximum sight adaptation time; and implement the second brightness level adjustment process when the computed ETA is less than the maximum sight adaptation time.

5. The system of claim 4, wherein the first brightness level adjustment process will cause the brightness level within the vehicle to be adjusted over a time period that at least substantially matches the maximum sight adaptation time.

6. The system of claim 4, wherein the second brightness level adjustment process will cause the brightness level within the vehicle to be adjusted over a time period that is less than the maximum sight adaptation time.

7. The system of claim 6, wherein the processing system is further configured to receive an immediate exit trigger signal and, upon receipt thereof, to implement the second brightness level adjustment process.

8. The system of claim 1, wherein the mission data source is further configured to receive one or more of data indicative of time, date, solar and lunar cycles, forecast weather, air particulate levels (dust or smog), whether the destination location is indoors or outdoors, primary direction, local terrain, and/or foliage concentration and to generate the destination data based additionally on the data.

9. The system of claim 1, wherein the interior brightness level data source comprises an interior luminance sensor configured to sense the current interior brightness level within the vehicle.

10. A method for adjusting brightness level within a vehicle, comprising the steps of:

supplying, to a processing system, destination brightness data, exterior brightness data, and interior brightness data;

processing, at least the destination data, the exterior brightness data, and the interior brightness data, in the processing system to:

compute an estimated time of arrival (ETA) for the vehicle to arrive at a predetermined mission destination location;

compare the computed ETA to a maximum sight adaptation time; and based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle, wherein:

the destination brightness data is indicative of a brightness level at the predetermined mission destination location;

the exterior brightness data is indicative of current exterior brightness level; and the interior brightness data is indicative of current interior brightness level within the vehicle, wherein the destination brightness data is generated at least from data indicative of an estimated time of arrival for the vehicle to arrive at a predetermined mission destination location.

11. The method of claim 10, wherein:

the first brightness level adjustment process includes a first sight adaptation time, which corresponds to a first time to adjust the brightness level within the vehicle to at least substantially match the exterior brightness level when the person exits vehicle at the predetermined mission destination location;

the second brightness level adjustment process includes a second sight adaptation time, which corresponds to a second time to adjust the brightness level within the vehicle to at least approach the exterior brightness level when the person exits vehicle at the predetermined mission destination location; and the first sight adaptation time is greater than the second sight adaptation time.

12. The method of claim 10, further comprising:

not implementing either the first brightness level adjustment process or second brightness level adjustment process when the computed ETA exceeds the maximum sight adaptation time;

implementing the first brightness level adjustment process when the computed ETA at least substantially equals the maximum sight adaptation time; and implementing the second brightness level adjustment process when the computed ETA is less than the maximum sight adaptation time.

13. The method of claim 12, wherein the first brightness level adjustment process will cause the brightness level within the vehicle to be adjusted over a time period that at least substantially matches the maximum sight adaptation time.

14. The method of claim 12, wherein the second brightness level adjustment process will cause the brightness level within the vehicle to be adjusted over a time period that is less than the maximum sight adaptation time.

15. The method of claim 14, further comprising implementing the second brightness level adjustment process upon receiving, in the processing system, an immediate exit trigger signal.

16. A sight adaptation system for a vehicle, comprising:

a mission data source configured to supply destination brightness data that is indicative of a brightness level at a predetermined mission destination location, the mission data source comprising a user interface configured to receive user input, wherein the destination brightness data is input manually via the user interface;

an interior brightness level data source configured to supply interior brightness data indicative of current interior brightness level within the vehicle; and a processing system coupled to receive at least the destination brightness data and the interior brightness data, the processing system configured to process at least the destination data and the interior brightness data to:

compute an estimated time of arrival (ETA) for the vehicle to arrive at the predetermined mission destination location;

compare the computed ETA to a maximum sight adaptation time; and based on the comparison of the computed ETA and the maximum sight adaptation time, selectively implement a first brightness level adjustment process for adjusting the interior brightness level within the vehicle or a second brightness level adjustment process for adjusting the interior brightness level within the vehicle, wherein:

the first brightness level adjustment process includes a first sight adaptation time, which corresponds to a first time to adjust the brightness level within the vehicle to at least substantially match the exterior brightness level when the person exits vehicle at the predetermined mission destination location;

the second brightness level adjustment process includes a second sight adaptation time, which corresponds to a second time to adjust the brightness level within the vehicle to at least approach the exterior brightness level when the person exits vehicle at the predetermined mission destination location; and the first sight adaptation time is greater than the second sight adaptation time.

\* \* \* \* \*